Oct. 20, 1931.    G. W. BAUGHMAN    1,827,772
APPARATUS FOR THE CONTROL OF HIGHWAY CROSSING SIGNALS
Filed July 17, 1930

INVENTOR
G. W. Baughman,
BY A. L. Vencill
His ATTORNEY

Patented Oct. 20, 1931

1,827,772

UNITED STATES PATENT OFFICE

GEORGE W. BAUGHMAN, OF PITTSBURGH, PENNSYLVANIA, ASSIGNOR TO THE UNION SWITCH & SIGNAL COMPANY, OF SWISSVALE, PENNSYLVANIA, A CORPORATION OF PENNSYLVANIA

APPARATUS FOR THE CONTROL OF HIGHWAY CROSSING SIGNALS

Application filed July 17, 1930. Serial No. 468,538.

My invention relates to apparatus for the control of highway crossing signals, and has for an object the provision of novel and improved means for controlling a crossing signal by one or more short auxiliary track circuits located within a main track circuit.

I will describe two forms of apparatus embodying my invention, and will then point out the novel features thereof in claims.

Figure 1:
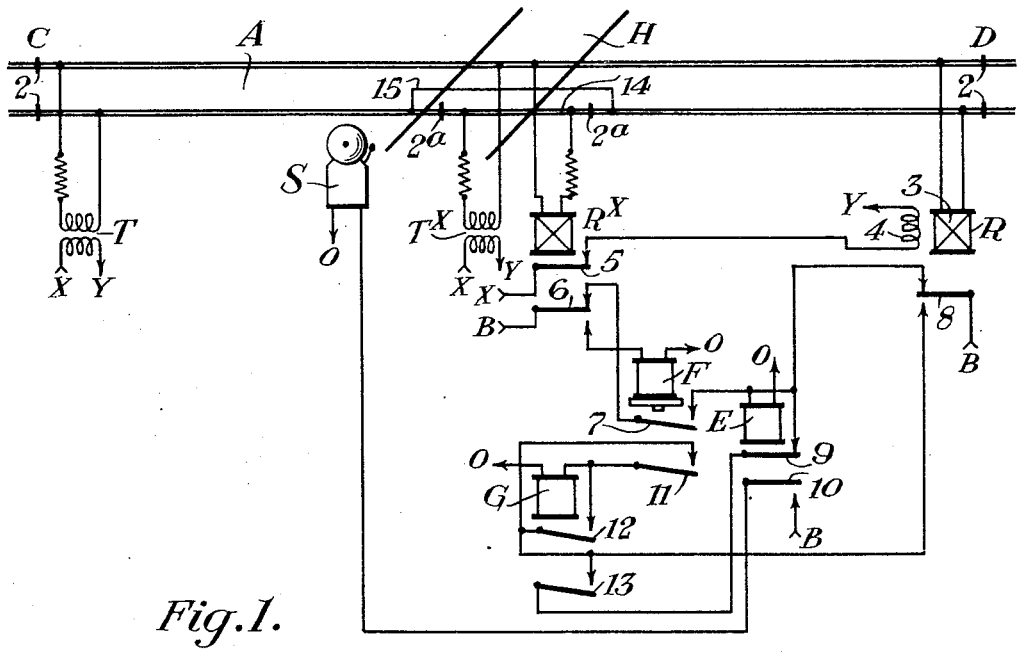
Figure 2:
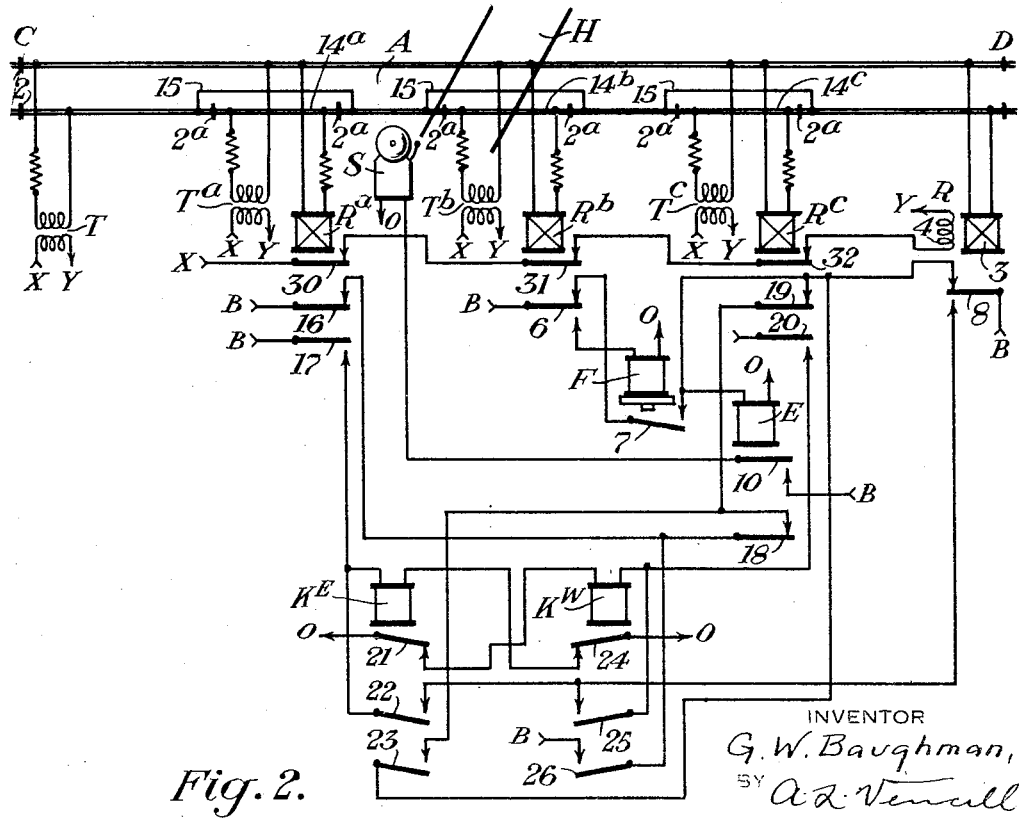

In the accompanying drawings, Fig. 1 is a diagrammatic view showing one form of apparatus embodying my invention and involving only one short insulated section within a main track section. Fig. 2 is a diagrammatic view showing a modified form of apparatus also embodying my invention and involving three short insulated sections within a main track section.

Similar reference characters refer to similar parts in each of the views.

Referring first to Fig. 1, the reference character A designates a railway track along which traffic normally moves in both directions, which track is intersected by a highway H. The track A is divided by insulated joints 2 to form a main track section C—D, and this section is provided with a track circuit comprising a source of current T and a track relay R. The source of current T is a transformer, the secondary of which is connected across the rails of the section C—D, and the primary of which is connected with a source of alternating current the terminals of which are designated X and Y. The track relay R comprises two windings 3 and 4, the former of which is connected across the rails of section C—D, and the latter of which is supplied with alternating current in the manner hereinafter explained.

The lower rail of the track A is divided by additional insulated joints $2^a$ to form an auxiliary track section 14, and the track circuit current for the main section C—D is carried around the section 14 by a conductor 15. The auxiliary section 14 is provided with a track circuit comprising a transformer $T^x$ and and auxiliary track relay $R^x$. Winding 4 of track relay R is provided with a circuit which passes from terminal X, through front contact 5 of relay $R^x$, and winding 4 to terminal Y. It will be seen, therefore, that winding 4 is deenergized whenever the auxiliary track relay $R^x$ is open.

The auxiliary track section 14 is located adjacent the highway H, and the intersection of the highway and the railway track is provided with a highway crossing signal S, which, as here shown, is an electric bell. This signal is controlled by the two track relays R and $R^x$, through the medium of a signal relay E, a slow-releasing relay F, and a stick relay G.

The signal relay E is provided with a main circuit which passes from terminal B of a suitable source of current, through front point of contact 8 of relay R, and the winding of relay E to terminal O of the same source of current. Relay F is provided with a circuit which includes a back point of contact 6 of relay $R^x$, which circuit will be obvious from the drawings. Relay E is provided with an auxiliary pick-up circuit which passes from terminal B, through the front point of contact 6 of relay $R^x$, front contact 7 of relay F, and the winding of relay E to terminal O. The stick relay G is provided with a pick-up circuit which passes from terminal B, through the back point of contact 8 of relay R, front contact 11 of relay F, and the winding of relay G to terminal O. This relay is provided with a stick circuit which passes from terminal B, through the back point of contact 8 of relay R, front contact 12 of relay G, and the winding of relay G to terminal O. The relay E is provided with a stick circuit which passes from terminal B, through the back point of contact 8 of relay R, front contact 13 of relay G, front contact 9 of relay E, and the winding of relay E to terminal O. The crossing signal S is provided with a circuit which includes back contact 10 of relay E and which will be obvious from the drawings.

When section C—D is unoccupied, track relays R and $R^x$ are energized, signal relay E is energized so that signal S is silent, and relays F and G are deenergized. When a train moving in either direction enters section C—D it will open track relay R and this will open the first circuit for relay E so that relay will open and signal S will start to operate. When the train enters the auxiliary section 14, it will open relay R˟, and this will close the circuit for relay F at the back point of contact 6. The closing of relay F will close the pick-up circuit for relay G at contact 11. When the rear end of the train passes out of section 14, relay R˟ will again become energized, and during the brief interval of time between the closing of the front point of contact 6 of this relay and the opening of contact 7 of relay F, relay E will become energized. The stick circuit for relay E will then become closed and the stick circuit for relay G will be held closed, so that relay E will remain energized. Signal S will cease operation as soon as relay E closes. When the train passes out of section C—D, track relay R will again become energized, thereby opening the stick circuits for relays G and E at the back point of contact 8, and closing the main circuit for relay E at the front point of contact 8.

The reason for controlling winding 4 of track relay R by relay R˟ is to avoid energization of relay R in the event that a car having a wheel base less than the length of track section 14 is left standing in this section. If this should occur, auxiliary relay R˟ will be open so that the circuit for winding 4 of relay R will be open, with the result that the latter relay will be deenergized.

Referring now to Fig. 2, the track section C—D is provided with three auxiliary sections $14^a$, $14^b$ and $14^c$, and each of these sections is provided with an auxiliary track circuit including a transformer T and a relay R provided with suitable distinguishing exponents. Each auxiliary track section is bridged by a conductor 15 to conduct the main track circuit current around the auxiliary section. Winding 4 of the main track relay R is controlled by contacts 30, 31 and 32 of the auxiliary track relays $R^a$, $R^b$ and $R^c$, in order to avoid false energization of relay R in the event of a car being left in any one of the auxiliary track sections.

The railway track A is intersected by a highway H at track section $14^b$, and the purpose of the other auxiliary track sections is to start the operation of the crossing signal S when a train approaching the highway H enters the section $14^a$ or $14^c$, depending upon the direction of movement of the train.

The signal S is controlled by a signal relay E in the same manner as in Fig. 1, and relay E is in turn controlled by slow-releasing relay F and track relay $R^b$ also as in Fig. 1.

The signal relay E is further controlled by two directional relays $K^E$ and $K^W$. Relay $K^E$ is provided with a pick-up circuit which passes from terminal B, through back contact 17 of track relay $R^A$, winding of relay $K^E$, and back contact 24 of relay $K^W$. Relay $K^E$ is provided with a stick circuit which passes from terminal B, through the back point of contact 8 of track relay R, front contact 22 of relay $K^E$, winding of relay $K^E$, and back contact 24 of relay $K^W$ to terminal O. Relay $K^W$ is provided with a similar pick-up circuit including back contact 20 of relay $R^c$ and back contact 21 of relay $K^E$; it is also provided with a similar stick circuit which includes the back point of contact 8 of relay R, front contact 25 of relay $K^W$, and back contact 21 of relay $K^E$. The additional circuits for relay E will be traced during the explanation of the operation of the apparatus.

As shown in the drawing, section C—D is unoccupied, so that all of the track relays are energized and signal relay E is energized, with the result that signal S is silent. The directional relays K are both deenergized.

If now a train moving toward the left enters section C—D, it will open track relay R, but this will have no effect on signal relay E because of a circuit which passes from terminal B, through front contact 16 of relay $R^a$, front contact 18 of relay E, front contact 19 of relay $R^c$, and the winding of relay E to terminal O. When the train enters section $14^c$, however, it will open relay $R^c$, thereby opening at contact 19 the circuit just traced for relay E, with the result that this relay will become deenergized and will cause the signal S to operate. The closing of back contact 20 of relay $R^c$ will close the pick-up circuit for directional relay $K^W$, and this relay will then remain closed by virtue of its stick circuit until the train passes point C. When the train enters section $14^b$, it will open track relay $R^b$, thereby energizing relay F, and when the rear end of the train leaves section $14^b$, relay E will become energized during the brief interval between the closing of relay $R^b$ and the opening of relay F. Relay E will then remain energized due to a stick circuit which passes from terminal B, through front contact 26 of relay $K^W$, front contact 18 of relay E, front contact 19 of relay $R^c$, and the winding of relay E to terminal O. When the train passes through track section $14^a$, it will have no effect on relays E, $K^E$ or $K^W$. When the rear end of the train leaves section C—D, track relay R will close, thereby releasing relay $K^W$ and closing the main circuit for relay E.

When a train moving toward the right passes through section C—D, the operation will be the same as before, except that directional relay $K^E$ instead of $K^W$ will become energized. After the train passes section $14^b$, the stick circuit for relay E will then be from terminal B, through contact 16 of relay $R^a$, contact 18 of relay E, contact 23 of relay $K^E$, and the winding of relay E to terminal O. In all other respects the operation of the apparatus will be the same as that which occurs when a train moving toward the left passes through section C—D.

Although I have herein shown and described only two forms of apparatus embodying my invention, it is understood that various changes and modifications may be made therein within the scope of the appended claims without departing from the spirit and scope of my invention.

Having thus described my invention, what I claim is:

1. In combination, a main section of railway track one of the rails of which is divided to form an auxiliary section, a track circuit including a main track relay for said main section, a track circuit including an auxiliary track relay for said auxiliary section, a signal relay, a slow-releasing relay, a stick relay, a circuit for said slow-releasing relay including a back contact of said auxiliary track relay, a pick-up circuit for said signal relay including a front contact of said auxiliary track relay and a front contact of said slow-releasing relay, a pick-up circuit for said stick relay including a back contact of said main track relay and a front contact of said slow-releasing relay, a stick circuit for said stick relay including a back contact of said main track relay, a stick circuit for said signal relay including a back contact of said main track relay and a front contact of said stick relay, a second pick-up circuit for said signal relay including a front contact of said main track relay, a highway intersecting said track adjacent said auxiliary section, and a highway crossing signal controlled by said signal relay.

2. In combination, a main section of railway track one of the rails of which is divided to form an auxiliary section, a track circuit for said main section comprising a source of current and a main track relay each of which is connected across the rails of the section, a track circuit for said auxiliary section comprising a source of current and an auxiliary track relay each of which is connected across the rails of the section, a highway intersecting said track adjacent said auxiliary section, and a signal for said highway controlled jointly by said two track relays.

3. In combination, a main section of railway track one of the rails of which is divided to form an auxiliary section, a main track relay having two windings, a track circuit for said main section including one winding of said relay, a track circuit for said auxiliary section including an auxiliary track relay, a circuit for the second winding of said main relay controlled by a front contact of said auxiliary relay, a highway intersecting said track, and a signal for said highway controlled by said track relays.

4. In combination, a main section of railway track one of the rails of which is divided to form three auxiliary sections, a track circuit for said main section comprising a source of current and a main track relay each of which is connected across the rails of the section, a track circuit for each auxiliary section comprising a source of current and an auxiliary track relay each of which is connected across the rails of the section, a highway intersecting said track adjacent the middle one of said auxiliary sections, a crossing signal for said highway, and means controlled by said relays for setting said signal into operation when a train approaching said crossing enters the first auxiliary section and for stopping the operation of said signal when the train leaves the middle section.

5. In combination, a main section of railway track one of the rails of which is divided to form an auxiliary section, a track circuit including a main track relay for said main section, a track circuit including an auxiliary track relay for said auxiliary section, a signal relay, a slow releasing relay and a stick relay, means for energizing said slow-releasing relay when said auxiliary track relay is open, means for energizing said signal relay when said main track relay is closed, means operating when said main track relay is open to energize said signal relay while said auxiliary track relay and said slow-releasing relay are both closed, means for energizing said stick relay when said main track relay is open and said slow-releasing relay is closed and for subsequently keeping it energized as long as the main track relay is open, means for keeping said signal relay closed while said main track relay is open and said stick relay is closed, a highway intersecting said track adjacent said auxiliary section, and a highway crossing signal controlled by said signal relay.

In testimony whereof I affix my signature.

GEORGE W. BAUGHMAN.